US008600563B2

(12) United States Patent
Ben-Yaacov et al.

(10) Patent No.: US 8,600,563 B2
(45) Date of Patent: Dec. 3, 2013

(54) HYBRID HEATING SYSTEM

(75) Inventors: Yoav Ben-Yaacov, Even Yehuda (IL); Harold Wiener, Jerusalem (IL); Shalom Lampert, Maalot (IL)

(73) Assignee: Phoebus Energy Ltd., Raanana (IL)

( * ) Notice: Subject to any disclaimer, the term of this patent is extended or adjusted under 35 U.S.C. 154(b) by 264 days.

(21) Appl. No.: 13/105,921

(22) Filed: May 12, 2011

(65) Prior Publication Data

US 2011/0218683 A1   Sep. 8, 2011

Related U.S. Application Data

(63) Continuation-in-part of application No. PCT/IL2009/001088, filed on Nov. 18, 2009.

(60) Provisional application No. 61/115,561, filed on Nov. 18, 2008.

(51) Int. Cl.
    *G05D 23/00* (2006.01)
(52) U.S. Cl.
    USPC ............................................. 700/278
(58) Field of Classification Search
    None
    See application file for complete search history.

(56) References Cited

U.S. PATENT DOCUMENTS

| 4,483,152 | A | * | 11/1984 | Bitondo ............................ 62/175 |
| 4,610,148 | A | * | 9/1986 | Shelton ............................ 62/480 |
| 4,716,957 | A | | 1/1988 | Thompson et al. |
| 4,943,003 | A | | 7/1990 | Shimizu et al. |
| 7,231,775 | B2 | * | 6/2007 | Dilk et al. ........................ 62/235 |
| 2002/0178047 | A1 | | 11/2002 | Or et al. |
| 2003/0159814 | A1 | * | 8/2003 | Sin et al. ........................ 165/151 |
| 2004/0128266 | A1 | | 7/2004 | Yellepeddy et al. |
| 2004/0238654 | A1 | * | 12/2004 | Hagen et al. .................. 237/12.1 |
| 2007/0112694 | A1 | | 5/2007 | Metcalfe |
| 2009/0295159 | A1 | * | 12/2009 | Johnson et al. ................. 290/44 |
| 2012/0235478 | A1 | * | 9/2012 | Hayashida ...................... 307/11 |
| 2012/0297808 | A1 | * | 11/2012 | Honda ........................... 62/238.7 |

* cited by examiner

*Primary Examiner* — Kavita Padmanabhan
*Assistant Examiner* — Patrick Cummins

(57) ABSTRACT

A hybrid heating system and method including: (a) a heat pump water heating system; (b) a conventional heating system including a conventional heater having a surface heat exchanger, and a primary circulation arrangement fluidly communicating with the surface exchanger, the primary circulation arrangement adapted to effect an exchange of heat between the surface heat exchanger and a flow of liquid to produce a heated flow of liquid; (c) a plurality of sensors associated with the heat exchange system; (d) an input arrangement adapted to provide cost data pertaining to a first power cost for supplying power to the heat pump system, and to cost information pertaining to a second power cost for operating the conventional system, and (e) a processor including a memory storing criteria specifying when to operate the heat pump water heating system, and when to operate the conventional heating system.

22 Claims, 4 Drawing Sheets

HYBRID HEATING SYSTEM

This patent application is a continuation-in-part of: PCT/IL2009/001088, filed on Nov. 18, 2009, which claims priority from U.S. Provisional Patent Application Ser. No. 61/115,561 filed on Nov. 18, 2008. U.S. Provisional Patent Application Ser. No. 61/115,561 is hereby incorporated by reference for all purposes as if fully set forth herein.

FIELD AND BACKGROUND OF THE INVENTION

The present invention relates to hybrid heating systems.

Consumer demand for electricity is generally not uniform over the course of a 24-hour period. Electric companies thus find that during peak hours the demand for electricity approaches, or may even exceed, the electricity generating capacity of the company. On the other hand, during hours when the demand for electricity is very low, for example, during part of the night, a significant portion of the electricity generating capacity is not utilized. Electric companies thus search for schemes to induce consumers to transfer some of their electricity consumption from the peak hours of demand to the off-peak hours. For example, many electric companies have instituted a pricing scheme wherein the cost of electricity to the consumer is highest during the period of peak demand and is significantly lower during the hours of low demand. Such a pricing scheme is sometimes known as a "time-of-use" pricing scheme.

Systems that generate hot water and/or steam for bathing, ambient heating and other uses may use electricity or fossil fuels as the energy source. In contrast to heating by electricity, the cost of water heating by fossil fuel burning may remain substantially constant over any 24-hour period. Therefore, in a time-of-use pricing scheme for electricity use, water heating by electricity during peak hours may be more expensive than heating by burning a fossil fuel. On the other hand, water heating by electricity during off-peak hours may be cheaper than heating by burning fossil fuels.

The present inventors have recognized a need for improved hybrid heating systems, and methods of operating such systems.

SUMMARY OF THE INVENTION

According to the teachings of the present invention there is provided a hybrid heating system including: (a) a heat pump water heating system including: (i) a pressurizing arrangement, associated with a refrigerant circulation pipe, adapted to increase a pressure of a first refrigerant fluid to produce a pressurized refrigerant fluid; (ii) a first heat exchange system including: a primary circulation arrangement, including, and fluidly communicating with, a first heat exchanger, the first exchanger fluidly communicating with the refrigerant circulation pipe, the first exchanger and the primary circulation arrangement adapted to effect an indirect heat exchange between a first flow of liquid and the pressurized refrigerant fluid, whereby heat is transferred from the pressurized refrigerant fluid to the first flow of liquid to produce a first heated flow of liquid, and whereby an enthalpy-reduced refrigerant fluid is produced, the heat exchange system optionally including at least a secondary circulation arrangement having, and fluidly communicating with, a secondary heat exchanger, (iii) a depressurizing arrangement, fluidly communicating with the refrigerant circulation pipe, and adapted to receive the enthalpy-reduced refrigerant fluid and to reduce a pressure thereof, to produce a depressurized refrigerant fluid having a lower pressure than the enthalpy-reduced fluid, and (iv) a second heat exchanger, the second exchanger fluidly communicating with the circulation pipe, and adapted to effect an exchange of heat between the depressurized refrigerant fluid and a heat source, whereby the first refrigerant fluid is produced; (b) a conventional heating system including at least one conventional heater having a surface heat exchanger, and a second primary circulation arrangement fluidly communicating with the surface exchanger, the second primary circulation arrangement adapted to effect an exchange of heat between the surface heat exchanger and a second flow of liquid to produce a second heated flow of liquid; (c) a plurality of sensors, each adapted to measure at least one system parameter, the plurality of sensors including at least a first temperature sensor and a second temperature sensor associated with the heat exchange system; (d) an input arrangement adapted to provide cost data pertaining to a first power cost for supplying power to the heat pump water heating system, and to cost information pertaining to a second power cost for operating the conventional heating system, and (e) a processor including a memory storing criteria specifying when to operate the heat pump water heating system, and when to operate the conventional heating system, the processor adapted to receive and to process: (i) the cost data; (ii) the cost information; (iii) system data pertaining to the system parameters; (iv) flow information pertaining to a flowrate of a liquid within any the circulation arrangement of the first heat exchange system, and (v) power consumption information pertaining to a power consumption of at least a portion of the heat pump water heating system, the processor further adapted to calculate and compare a cost of operating the heat pump water heating system and the conventional heating system, based on the cost data, the cost information, the system data, the flow information, and the consumption information, and based on the criteria, to control operation of the heating systems.

According to another aspect of the present invention there is provided a hybrid heating system including: (a) a heat pump water heating system including: (i) a pressurizing arrangement, associated with a refrigerant circulation pipe, adapted to increase a pressure of a first refrigerant fluid to produce a pressurized refrigerant fluid; (ii) a first heat exchange system including: a primary circulation arrangement, including, and fluidly communicating with, a first heat exchanger, the first exchanger fluidly communicating with the refrigerant circulation pipe, the first exchanger and the primary circulation arrangement adapted to effect an indirect heat exchange between a first flow of liquid and the pressurized refrigerant fluid, whereby heat is transferred from the pressurized refrigerant fluid to the first flow of liquid to produce a first heated flow of liquid, and whereby an enthalpy-reduced refrigerant fluid is produced, the heat exchange system optionally including at least a secondary circulation arrangement having, and fluidly communicating with, a secondary heat exchanger, (iii) a depressurizing arrangement, fluidly communicating with the refrigerant circulation pipe, and adapted to receive the enthalpy-reduced refrigerant fluid and to reduce a pressure thereof, to produce a depressurized refrigerant fluid having a lower pressure than the enthalpy-reduced fluid, and (iv) a second heat exchanger, the second exchanger fluidly communicating with the circulation pipe, and adapted to effect an exchange of heat between the depressurized refrigerant fluid and a heat source, whereby the first refrigerant fluid is produced; (b) a conventional heating system including at least one conventional heater having a surface heat exchanger, and a second primary circulation arrangement fluidly communicating with the surface exchanger, the second primary circulation arrangement adapted to effect an exchange of heat between the surface heat exchanger and a second flow of liquid to produce a second heated flow of liquid, the hybrid heating system configured to direct the first and second heated flows of liquid towards an identical consumer; (c) an input arrangement adapted to provide cost data pertaining to a first power cost for supplying power to the heat pump water heating system, and to cost information pertaining to a second power cost for operating the conventional heating system, and (d) a processor including a memory storing criteria specifying when to operate the heat pump water heating system, and when to operate the conventional heating system, the processor adapted to receive and to process: (i) the cost data; and (ii) the cost information, the processor further adapted to calculate and compare a cost of operating the heat pump water heating system and the conventional heating system, based on the cost data and the cost information, and based on the criteria, to control operation of the heating systems, the processor further adapted to control the operation of the heat pump water heating system to increase a thermal storage of a thermal storage arrangement, associated with the hybrid heating system, responsive to a forecast pertaining to a hot water load or demand from the consumer or a consumer network.

According to yet another aspect of the present invention there is provided a hybrid heating system including: (a) a heat pump water heating system including: (i) a pressurizing arrangement, associated with a refrigerant circulation pipe, adapted to increase a pressure of a first refrigerant fluid to produce a pressurized refrigerant fluid; (ii) a first heat exchange system including: a primary circulation arrangement, including, and fluidly communicating with, a first heat exchanger, the first exchanger fluidly communicating with the refrigerant circulation pipe, the first exchanger and the primary circulation arrangement adapted to effect an indirect heat exchange between a first flow of liquid and the pressurized refrigerant fluid, whereby heat is transferred from the pressurized refrigerant fluid to the first flow of liquid to produce a first heated flow of liquid, and whereby an enthalpy-reduced refrigerant fluid is produced, the heat exchange system optionally including at least a secondary circulation arrangement having, and fluidly communicating with, a secondary heat exchanger, (iii) a depressurizing arrangement, fluidly communicating with the refrigerant circulation pipe, and adapted to receive the enthalpy-reduced refrigerant fluid and to reduce a pressure thereof, to produce a depressurized refrigerant fluid having a lower pressure than the enthalpy-reduced fluid, and (iv) a second heat exchanger, the second exchanger fluidly communicating with the circulation pipe, and adapted to effect an exchange of heat between the depressurized refrigerant fluid and a heat source, whereby the first refrigerant fluid is produced; (b) a conventional heating system including at least one conventional heater having a surface heat exchanger, and a second primary circulation arrangement fluidly communicating with the surface exchanger, the second primary circulation arrangement adapted to effect an exchange of heat between the surface heat exchanger and a second flow of liquid to produce a second heated flow of liquid, the hybrid heating system configured to direct the first and second heated flows of liquid towards an identical consumer; (c) at least one sensor, including at least one temperature sensor; (d) an input arrangement adapted to provide cost data pertaining to a first power cost for supplying power to the heat pump water heating system, and to cost information pertaining to a second power cost for operating the conventional heating system, and (e) a processor including a memory storing criteria specifying when to operate the heat pump water heating system, and when to operate the conventional heating system, the processor adapted to receive and to process: (i) the cost data; and (ii) the cost information; the processor adapted to control operation of the conventional heating system and the heat pump water heating system based on the criteria, the processor further adapted to calculate and compare a cost of operating the heat pump water heating system and the conventional heating system, based on the cost data and the cost information, and based on a first predicted efficiency of the heat pump water heating system, the predicted efficiency dependent on at least one parameter selected from the group of parameters consisting of an ambient parameter, an inlet liquid temperature to the first exchanger, and an inlet liquid flowrate to the first exchanger, and based on the criteria, to control operation of the heating systems.

According to yet another aspect of the present invention there is provided a hybrid heating system substantially as described herein, the system including any feature described, either individually or in combination with any feature, in any configuration.

According to yet another aspect of the present invention there is provided a method of producing and supplying heated water to a consumer or to a consumer network, substantially as described herein, the method including any feature described, either individually or in combination with any feature, in any configuration.

According to further features in the described preferred embodiments, the processor is adapted to receive and to process the power consumption information pertaining to a total power consumption of the heat pump water heating system.

According to still further features in the described preferred embodiments, the hybrid system is configured to direct the first heated flow of liquid and the second heated flow of liquid towards an identical consumer/consumer network.

According to still further features in the described preferred embodiments, the processor is adapted to control operation of the conventional heating system and the heat pump water heating system based on the criteria, to reduce or minimize a cost.

According to still further features in the described preferred embodiments, the processor is adapted to calculate and compare a cost of operating the heat pump water heating system and the conventional heating system, to control operation of the heating systems, to reduce or minimize a cost.

According to still further features in the described preferred embodiments, the processor is adapted to utilize the cost data and to decide whether to operate the conventional heating system or to operate the heat pump water heating system.

According to still further features in the described preferred embodiments, the second heat exchanger is adapted whereby the exchange of heat between the depressurized refrigerant fluid and the heat source is effected by means of a forced air circulation unit. The forced air circulation unit may be adapted to direct a supply of ambient air, as the heat source, to effect the exchange of heat.

According to still further features in the described preferred embodiments, the hybrid heating system further includes a power consumption sensor providing the power consumption information.

According to still further features in the described preferred embodiments, the hybrid heating system further includes a flow sensor, associated with any the circulation arrangement, and providing the flow information.

According to still further features in the described preferred embodiments, the first sensor is disposed in an upstream location with respect to the first heat exchanger, and the second sensor disposed in a downstream location with respect to the first heat exchanger.

According to still further features in the described preferred embodiments, the processor is adapted to receive and to process flow information pertaining to a flowrate of the second flow of liquid.

According to still further features in the described preferred embodiments, the processor is adapted to calculate a heat transferred by the heat pump system to a liquid within the first heat exchange system, based partly on a temperature differential between the second temperature sensor and the first temperature sensor.

According to still further features in the described preferred embodiments, the primary circulation arrangement of the first heat exchange system is adapted to direct the first heated flow of liquid towards a consumer.

According to still further features in the described preferred embodiments, the secondary circulation arrangement of the first heat exchange system is adapted to direct a heated flow of liquid towards a consumer.

According to still further features in the described preferred embodiments, the first power cost pertains to a cost of electricity.

According to still further features in the described preferred embodiments, the second power cost pertains to a cost of fuel for operating the conventional heating system.

According to still further features in the described preferred embodiments, the pressurizing arrangement includes a compression arrangement, the first refrigerant fluid is a first refrigerant gas, and the pressurized refrigerant fluid is a compressed refrigerant gas.

According to still further features in the described preferred embodiments, the compression arrangement includes a compressor, adapted to be electrically connected to a power supply and fluidly communicating with the refrigerant circulation pipe, the compressor adapted to compress the first refrigerant gas to produce the compressed gas.

According to still further features in the described preferred embodiments, the heat pump water heating system is adapted to condense at least a portion of the compressed refrigerant gas into the enthalpy-reduced refrigerant fluid to produce a refrigerant liquid.

According to still further features in the described preferred embodiments, the hybrid heating system further includes a thermal storage arrangement adapted to fluidly communicate with the circulation arrangement, the processor further adapted to control the heat pump water heating system to increase a thermal storage of the thermal storage arrangement responsive to a time-of-use pricing scheme.

According to still further features in the described preferred embodiments, the depressurizing arrangement includes an expansion valve, fluidly communicating with the circulation pipe and adapted to reduce a pressure and a temperature of the enthalpy-reduced refrigerant fluid.

According to still further features in the described preferred embodiments, based on the criteria, the processor is adapted to operate the conventional heating system and the heat pump water heating system in a simultaneous mode.

According to still further features in the described preferred embodiments, the processor is further adapted to control operation of the conventional heating system and the heat pump water heating system based on a first predicted efficiency of the heat pump water heating system, the predicted efficiency dependent on at least one parameter selected from the group of parameters consisting of an ambient parameter, an inlet liquid temperature to the first exchanger, and an inlet liquid flowrate to the first exchanger.

According to still further features in the described preferred embodiments, the processor is further adapted to control operation of the conventional heating system and the heat pump water heating system based on a second predicted efficiency of the conventional heating system.

According to still further features in the described preferred embodiments, the second predicted efficiency is dependent on a forecast of a hot water load or demand.

According to still further features in the described preferred embodiments, the second predicted efficiency is dependent on a variable efficiency parameter of the conventional heating system.

According to still further features in the described preferred embodiments, the variable efficiency parameter provides an estimated efficiency of the conventional heating system based on a time position within a maintenance cycle of the conventional heating system.

According to still further features in the described preferred embodiments, the at least one ambient parameter includes an ambient temperature.

According to still further features in the described preferred embodiments, the at least one ambient parameter includes an ambient humidity.

According to still further features in the described preferred embodiments, the conventional heater has a thermal efficiency of less than 99%.

According to still further features in the described preferred embodiments, the conventional heater is selected from the group of heaters consisting of fossil fuel burning heaters, biomass burning heaters, and electrical resistance heaters.

According to still further features in the described preferred embodiments, the conventional heater includes at least one steam boiler.

According to still further features in the described preferred embodiments, the hybrid heating system includes at least one solar heater.

According to still further features in the described preferred embodiments, the criteria are at least partly based on efficiency information pertaining to the conventional heating system.

According to still further features in the described preferred embodiments, the criteria are at least partly based on coefficient of performance (COP) information pertaining to the heat pump water heating system.

According to still further features in the described preferred embodiments, the COP information is derived from the data pertaining to the system parameters, the flow information, and the power consumption information.

According to still further features in the described preferred embodiments, the efficiency information includes a calculated efficiency based on an actual efficiency of the conventional heating system over a particular period of time.

According to still further features in the described preferred embodiments, the efficiency information includes a calculated efficiency further based on a current time position within a maintenance time cycle of the conventional heating system.

According to still further features in the described preferred embodiments, the COP information includes an actual COP of the heat pump water heating system over at least one particular period of time.

According to still further features in the described preferred embodiments, the COP information includes an average COP of the heat pump water heating system, the average based on a plurality of the one particular period of time.

According to still further features in the described preferred embodiments, the COP information is based on a plurality of actual COP data previously attained by the heat pump system.

According to still further features in the described preferred embodiments, the plurality of actual COP data is weighted according to a similarity criterion between past operating conditions and present operating conditions of the heat pump water heating system.

According to still further features in the described preferred embodiments, the COP information is based on a regression of a plurality of actual COP data previously attained by the heat pump system, wherein a weighting of the actual COP data is based on a similarity criterion between past operating conditions and present operating conditions of the heat pump water heating system.

According to still further features in the described preferred embodiments, the past and present operating conditions include at least one of an ambient temperature, a relative or absolute humidity, an inlet liquid temperature to the first exchanger, an inlet liquid flowrate to the first exchanger, and an energy demand.

According to still further features in the described preferred embodiments, the hybrid heating system further includes an air conditioning system adapted to cool at least one volume, space or room, the heat pump water heating system and the air conditioning system adapted to operate, upon demand, concurrently in opposite heating modes, and wherein, when the air conditioning system operates in cooling mode, the processor is adapted to receive and to process the cost data, the cost information, data pertaining to the system parameters, flow information pertaining to a flowrate of the first flow of liquid, and power consumption information pertaining to a power consumption of at least a portion of the heat pump water heating system, and to control operation of the conventional heating system and the heat pump water heating system based on the criteria.

According to still further features in the described preferred embodiments, the air conditioning system is a heat pump conditioning system further adapted to heat the at least one volume, space, or room.

According to still further features in the described preferred embodiments, the heat pump water heating system and the air conditioning system adapted to operate, upon demand, concurrently in a heating mode, and wherein, when the air conditioning system operates in the heating mode, the processor is adapted to receive and to process the cost data, the cost information, data pertaining to the system parameters, flow information pertaining to a flowrate of the first flow of liquid, and power consumption information pertaining to a power consumption of at least a portion of the heat pump water heating system, and to control operation of the conventional heating system and the heat pump water heating system based on the criteria.

According to still further features in the described preferred embodiments, the hybrid heating system further includes a storage tank adapted to provide a heated flow of water for a consumer.

According to still further features in the described preferred embodiments, the first heated flow of liquid and the second heated flow of liquid are disposed in a common line or pipe, whereby the first heated flow of liquid and the second heated flow of liquid are substantially identical.

According to still further features in the described preferred embodiments, the processor is further adapted to control the operation of the heat pump water heating system to increase the thermal storage during periods of off-peak electricity rates.

According to still further features in the described preferred embodiments, the processor is adapted to receive a manual input of the forecast.

According to still further features in the described preferred embodiments, the processor is adapted to receive occupancy data pertaining to a known occupancy of the consumer network adapted to fluidly communicate with the thermal storage arrangement.

According to still further features in the described preferred embodiments, the processor is adapted to process the occupancy data to at least partially effect the forecast.

According to still further features in the described preferred embodiments, the processor is adapted to receive estimated occupancy data pertaining to an estimated occupancy of the consumer network.

According to still further features in the described preferred embodiments, the processor is adapted to process the estimated occupancy data to at least partially effect the forecast.

According to still further features in the described preferred embodiments, the processor is adapted to automatically receive data pertaining to the forecast.

According to still further features in the described preferred embodiments, the processor is adapted to automatically receive data pertaining to registration data in the consumer network.

According to still further features in the described preferred embodiments, the consumer network includes a hospital.

According to still further features in the described preferred embodiments, the consumer network includes a hotel.

According to still further features in the described preferred embodiments, the consumer network is selected from the group of networks including an industrial factory, a building, a neighborhood, an army facility, a home, and a prison.

According to still further features in the described preferred embodiments, the forecast is at least partially based on information pertaining to a current water consumption of the hybrid heating system.

According to still further features in the described preferred embodiments, the forecast is at least partially based on information pertaining to a historical hot water demand trend.

According to still further features in the described preferred embodiments, the historical hot water demand trend is dependent on a time of day.

According to still further features in the described preferred embodiments, the historical hot water demand trend is of the hybrid heating system.

According to still further features in the described preferred embodiments, the historical hot water demand trend is seasonally dependent.

According to still further features in the described preferred embodiments, the historical hot water demand trend is correlated to at least one weather condition.

According to still further features in the described preferred embodiments, the forecast is based on information pertaining to a historical hot water demand for a same day of a week as a current day of operating the hybrid system.

According to still further features in the described preferred embodiments, the increase in the thermal storage is an increase in an average thermal storage.

According to still further features in the described preferred embodiments, the increase in the average thermal storage includes an increase of at least 10% of available heat of the average thermal storage.

According to still further features in the described preferred embodiments, the increase in the average thermal storage includes an increase of at least 25% of available heat of the average thermal storage.

According to still further features in the described preferred embodiments, the increase in the thermal storage is at least partially effected by controlling a fill volume of the thermal storage.

According to still further features in the described preferred embodiments, the increase in the thermal storage is at least partially effected by increasing a temperature of the water produced by the heat pump water heating system.

BRIEF DESCRIPTION OF THE DRAWINGS

The invention is herein described, by way of example only, with reference to the accompanying drawings. With specific reference now to the drawings in detail, it is stressed that the particulars shown are by way of example and for purposes of illustrative discussion of the preferred embodiments of the present invention only, and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice. Throughout the drawings, like-referenced characters are used to designate like elements.

In the drawings.

DESCRIPTION OF THE PREFERRED EMBODIMENTS

Figure 1:
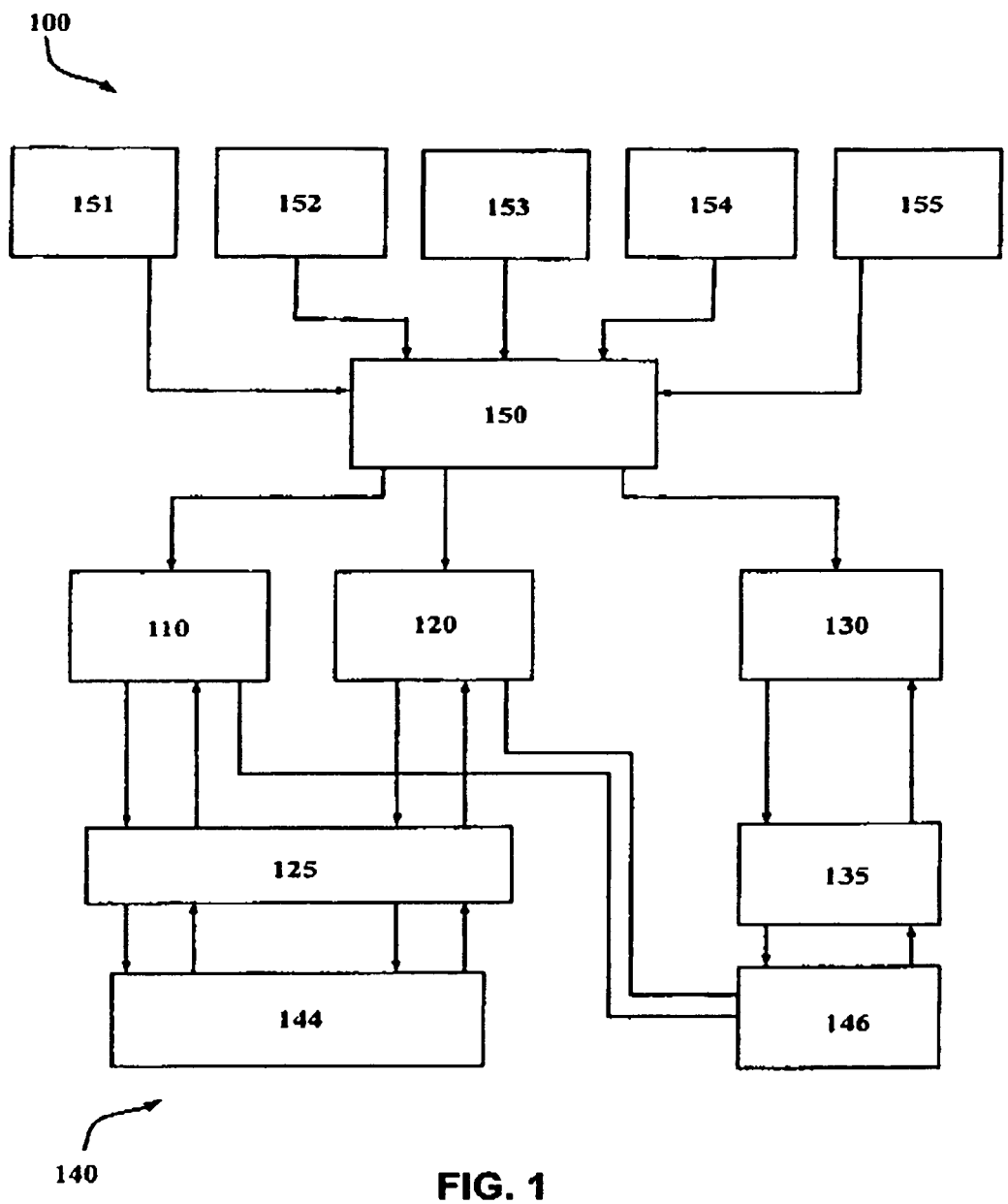
FIG. 1 is a schematic block diagram of a hybrid heating and conditioning system in accordance with the present invention.

The principles and operation of the hybrid heating and conditioning system of the present invention may be better understood with reference to the drawings and the accompanying description.

Before explaining at least one embodiment of the invention in detail, it is to be understood that the invention is not limited in its application to the details of construction and the arrangement of the components set forth in the following description or illustrated in the drawings. The invention is capable of other embodiments or of being practiced or carried out in various ways. Also, it is to be understood that the phraseology and terminology employed herein is for the purpose of description and should not be regarded as limiting.

In a first aspect, the present invention provides a method and system for water heating that takes advantage of a time-of-use pricing scheme and/or the high coefficient of performance of heat pump systems. The system of the invention includes one or more conventional heaters such as electric water heaters and fossil fuel burners, and at least one heat pump water heating system. The hybrid heating system of the present invention may be configured whereby the heat pump system and the conventional heater are alternative heating systems, either of which may be solely or singly operated to handle the heating load. The heat pump system and the conventional heater may be operated in alternate fashion, and may succeed each other in a substantially continuous manner. A processor is configured to operate the one or more conventional heaters when water heating using conventional heaters is less expensive than heating by electricity using the heat pump water heating system. The processor is further configured to operate the one or more heat pump water heating systems when the operation of the system is less expensive than the operation of the conventional heating system, for a given heat load or demand.

FIG. 1 is a schematic block diagram of a hybrid heating and conditioning system 100 in accordance with one embodiment of the invention. Heating system 100 may provide hot water and/or steam to at least a part of a building (not shown in FIG. 1). Heating system 100 may include at least one conventional burning or heating system 110, e.g., fossil fuel burning heaters, electric coil heaters, etc. Heating system 100 may further include at least one heat pump water heating system 120, and in some cases, at least one chiller or reversible heat pump system 130 adapted to cool at least one room or space. Chiller system 130 may be further adapted, in an opposite mode, to heat at least one room or space.

Conventional burning or heating system 110 and heat pump water heating system 120 may fluidly communicate with at least one thermal storage tank 125. Chiller system 130 may fluidly communicate with at least one thermal storage tank 135. One or more consumers 140 may receive a supply of hot water from thermal storage tank 125. One or more consumers 140 may also receive a supply of conditioned (hot or cold) water from thermal storage tank 135, for providing heating or cooling to at least one room or space. In some cases, air is heated or cooled by this supply of conditioned water by means of a heat exchanger (not shown), and the conditioned air is then distributed to heat or cool the at least one room or space.

Thus, consumers 140 may be categorized as one or more hot water consumers 144 and/or one or more conditioning consumers 146.

Operation of conventional heating system 110, heat pump water heating system 120, and chiller system 130 may be advantageously controlled by a processor or controller 150. Processor 150 may be adapted to receive at least one environmental input 151, one or more system inputs 152, one or more cost inputs 153 pertaining to the cost of power (e.g., fuel and electricity), one or more efficiency inputs 154 pertaining to the efficiency of conventional heating system 110, and/or heat pump water heating system 120, and/or chiller system 130, and at least one demand forecast input 155 including data pertaining to, or correlated with, future demand for hot water or other utilities. Processor 150 may include a memory storing a first set of one or more criteria specifying when water is to be heated by conventional heating system 110 and a second set of one or more criteria specifying when water is to be heated by heat pump water heating system 120. In some instances, the sets of criteria may dictate the simultaneous operation of conventional heating system 110 and heat pump water heating system 120. As will be elaborated in greater detail hereinbelow, processor 150 processes information from at least a portion of inputs 151-155 and may control operation of conventional heating system 110 and heat pump water heating system 120 based on these sets of criteria.

Figure 2:
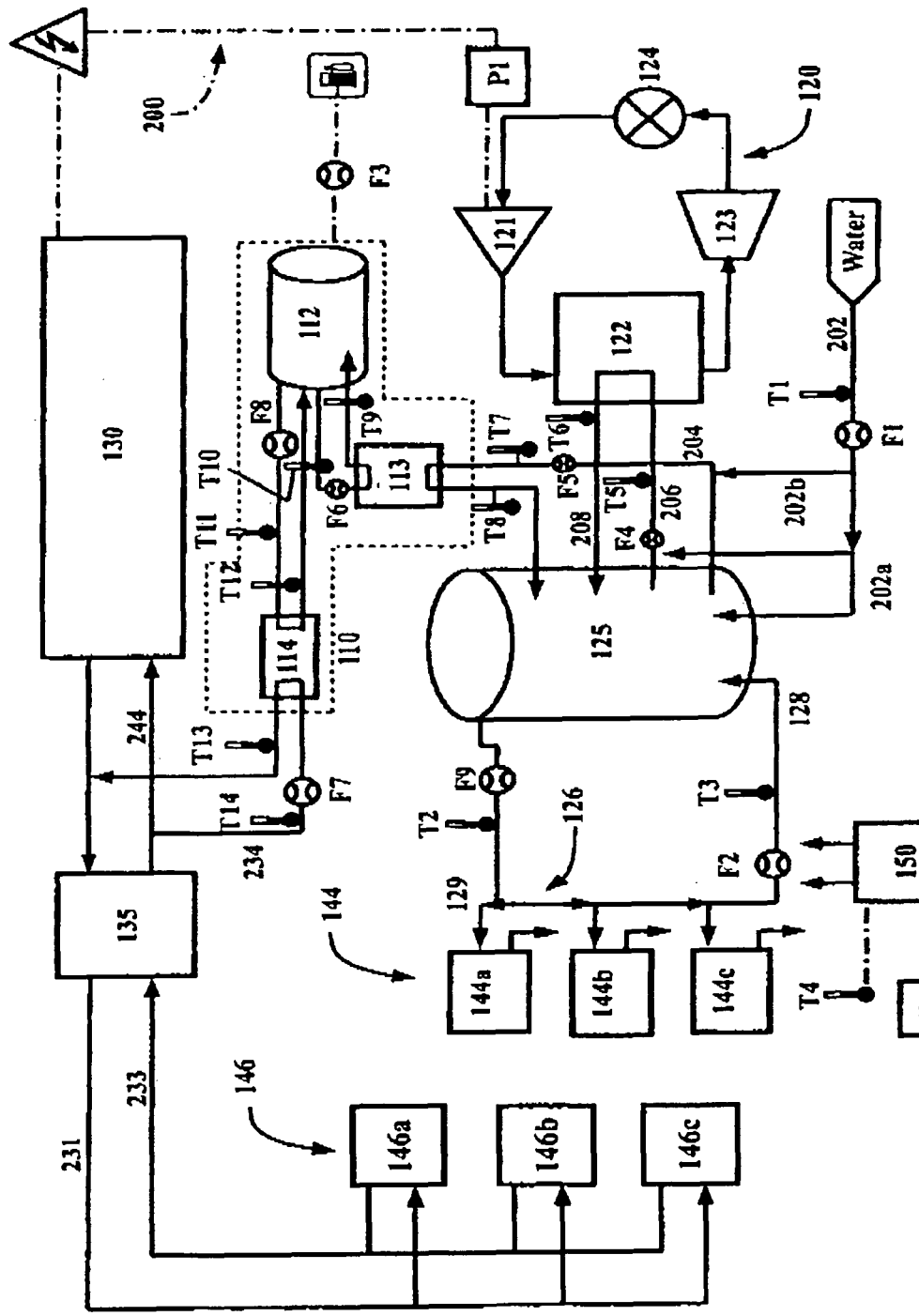
FIG. 2 is a schematic flowsheet of a hybrid heating and conditioning system according to the present invention.

FIG. 2 is a schematic flowsheet of a hybrid heating and conditioning system 200 in accordance with one embodiment of the invention. Hybrid heating and conditioning system 200 may include conventional heating system 110, heat pump water heating system 120, and chiller or reversible heat pump system 130, thermal storage tanks 125 and 135, processor 150, and a plurality of sensors and/or measuring devices such as flowmeters F1-F8, temperature instruments or indicators T1-T14, a humidity-measuring instrument H1, and a power-measuring instrument P1. Hybrid heating system 200 may be adapted to connect to hot water consumers 144, such as particular hot water consumers 144*a*, 144*b*, and 144*c*. Hybrid heating system 200 may be further adapted to connect to conditioning consumers 146, such as particular conditioning consumers 146*a*, 146*b*, and 146*c*.

Thermal storage tank 125, which may be operated as a pressurized vessel (typically at least 2-3 barg), may be heated by conventional heating system 110 and/or heat pump water heating system 120. Hot water may be circulated to hot water consumers 144*a*, 144*b*, and 144*c* via a hot water delivery line 129 of thermal storage tank 125. Unused hot water may be returned to storage tank 125 via a recirculation line 128.

Similarly, conditioning fluid inside thermal storage tank 135 may be chilled by chiller or reversible heat pump system 130, or may be heated by reversible heat pump system 130 and/or by conventional heating system 110. The conditioning fluid, which is usually water, may be circulated to conditioning consumers 146 such as conditioning consumers 146*a*, 146*b*, and 146*c*, via a discharge line 231 of thermal storage tank 135. If the conditioning fluid is a gas like air, a thermal storage tank such as thermal storage tank 135 may be unnecessary. After transferring cold or heat to consumers 146*a*, 146*b*, and/or 146*c*, the conditioning fluid may be returned to thermal storage tank 135 via a return line 233 of thermal storage tank 135.

Heat pump water heating system 120 may include a compressor 121, a first heat exchanger or condenser 122, an expansion valve 123, a second heat exchanger or evaporator 124, and a refrigerant (not shown) such as a Freon, disposed within and circulated within heat pump water heating system 120. While Freon has been used as an exemplary refrigerant, one of ordinary skill in the art will readily appreciate that various refrigerants or mixtures of refrigerants may be employed, including water, carbon dioxide and ammonia.

The cyclic operation of exemplary heat pump water heating system 120 works substantially as follows: compressor 121 compresses the refrigerant gas, raising the pressure and temperature of the gas. In first heat exchanger 122, the refrigerant gas is subjected to an indirect (surface) heat exchange arrangement with respect to a flow of water (e.g., a flow of water coming at least partially from storage tank 125), via a cold or inlet water line or pipe 206. At least a portion of the refrigerant gas condenses to form a liquid phase, whereby the latent heat of the refrigerant may be substantially transferred to the flow of water coming from storage tank 125.

Subsequently, the liquid refrigerant (or the at least partially condensed refrigerant fluid) flows through expansion valve 123, reducing the pressure and temperature of the liquid refrigerant. The evaporation takes place in second heat exchanger 124: the cooled refrigerant is heated by a heating fluid (e.g., forced air circulation using ambient air, by means of forced air circulation unit 124*a*, or water or liquid from a water or liquid reservoir) in second heat exchanger 124, where the refrigerant liquid is evaporated. The cycle then repeats: the refrigerant gas is delivered to, and compressed by, compressor 121, as described hereinabove.

While heat pump water heating system 120 has been described as an electrically powered, compressor driven system, one of ordinary skill in the art will readily appreciate that various heat pump systems may be employed. One prominent example is a fuel-powered heat pump system (e.g., operating on natural gas) in which a chemical process may substitute for the motor-driven compressor. Another example is a heat pump system utilizing carbon dioxide (or another non-condensing gas) as the refrigerant, in which case, the refrigerant may not undergo a phase change (e.g., within either heat exchanger). Another example is a heat pump system utilizing water (or another liquid) as the refrigerant, in which case, a vacuum pump or the like may be used to increase the pressure of the water, instead of the compressor described hereinabove.

Chiller or reversible heat pump system 130 may include substantially the same equipment as heat pump water heating system 120. In chilling mode, however, chiller system 130 operates in a reverse direction with respect to heat pump water heating system 120, such that the conditioning fluid is cooled before being circulated to conditioning consumers 146 via a discharge line 232 of thermal storage tank 135.

When conditioning consumers 146 require heat (e.g., in the winter), the direction of heat pump system 130 may be reversed, such that the conditioning fluid is heated before being circulated to conditioning consumers 146 via a discharge line 232 of thermal storage tank 135.

Conventional heating system 110 includes a boiler 112 and may include a heat exchanger 113 adapted to indirectly exchange heat between a hot stream from boiler 112 and inlet water pipe 204 associated with storage tank 125. Conventional heating system 110 may include a second heat exchanger 114 adapted to indirectly exchange heat between a hot stream from boiler 112 and cold water pipe 234 fluidly communicating with storage tank 135.

Flowmeter F3 may advantageously measure a flow quantity (e.g., volume) or flowrate of fuel to boiler 112.

Processor 150 may be adapted to receive information from various temperature instruments (e.g., thermocouples), such as T1-T14, and flowmeters (magnetic flowmeters, volumetric gauges, etc.) such as F1-F8. These instruments may provide signals pertaining to system inputs such as, but not limited to, make-up water temperature (by means of T1) and make-up water flow quantity or flowrate (by means of F1), water temperature out of storage tank 125 (by means of T2), water temperature of recirculated water being returned from consumers 144, via recirculation line 128, to storage tank 125 (by means of T3), flow quantity or flowrate in circulation line 126 (by means of F2), flow quantity or flowrate of fuel to conventional heating system 110 (by means of F3), and power consumption of heat pump system 120 (by means of P1).

Processor 150 may be further adapted to receive information pertaining to one or more environmental inputs 151, such as, but not limited to, ambient temperature (by means of T4) and humidity or relative humidity (by means of H1).

Processor 150 may be further adapted to receive one or more cost inputs 153 pertaining to the cost of fuel and electricity. Typically, the cost of fuel is location-specific, and may depend on the amount of fuel purchased. Consequently, it may be advantageous to have the cost of fuel manually uploaded, e.g., by an operator of the system. The cost of electricity may vary according to the time of day (24 hours), the day of the week, and the season. The electricity tariff may advantageously be input from a database such as a web-based database, e.g., from a website of the electricity provider.

Processor 150 may advantageously include a memory storing criteria specifying when the first flow of water is to be heated by the heat pump water heating system, and when the first flow of water is to be heated by the conventional heating system. Such criteria may dictate the simultaneous operation of conventional heating system 110 and heat pump water heating system 120.

Processor 150 may be further adapted to receive one or more efficiency inputs 154 pertaining to the efficiency of conventional heating system 110, and/or heat pump water heating system 120, and/or chiller system 130. The efficiency may be, or may be based on, a rated efficiency, such as a manufacturer's rated efficiency.

However, we have found the use of a calculated efficiency to be particularly advantageous. For the conventional heating system, the calculated efficiency may be based on the actual efficiency of the conventional heating system over a particular or pre-determined period of time, for example, a one-time measurement-based calculation of heat transferred to the water per measured fuel consumption. The measurements and efficiency calculations may span over a number of hours or days, for example, at least 0.25 hours, at least 1 hour, at least 3 hours, at least 24 hours, or at least 7 days. The measurements and efficiency calculations may span over the last X number of hours or days (X>0), for example, the last hour, the last 3 hours, the last 24 hours, or the last 7 days.

Preferably, the power measurement is measured in cumulative fashion over each period.

By way of example, the measurement-based calculation of heat transferred to the water may be performed by measuring the temperature of the water introduced to boiler 112, the temperature of the heated water exiting of boiler 112, and the flowrate of the water (identical for both streams).

Alternatively or additionally, the calculated efficiency may be based on the current time place within the maintenance time cycle. We have found that after cleaning and major maintenance of conventional heating systems such as fossil-fuel burning systems, the actual efficiency may change appreciably and to a large degree—repeatably—over time. For example, the measured efficiency of a particular fossil-fuel burning system may decrease from about 80% after an annual maintenance and cleaning procedure, to about 65% after 12 months of operation. Given, by way of example, a substantially linear decrease (or other monotonic decrease) in efficiency, after 8 months of operation, the estimated efficiency would be:

80%−(8/12)*(80%−65%)=70%.

Regarding the heat pump water heating system, the calculated or estimated coefficient of performance (COP) may be based, at least in part, on the actual, measurement-based calculation of the COP of the heat pump water heating system over at least one particular or pre-determined period of time. Preferably, the calculated or estimated COP may be based, at least in part, on the COP attained during similar operating conditions including similar ambient temperatures, relative or absolute humidity, and similar energy demand.

When the at least one particular period of time is a plurality of particular periods of time, each of those periods may be at least 1 minute, at least 2 minutes, at least 5 minutes, or at least 15 minutes.

In one preferred embodiment, the calculated or estimated COP may be at least partly based on COP values attained by, or simulated for, the system under similar ambient temperatures, e.g., within ±2° C., within ±1.5° C., within ±1.2° C., or within ±1.0° C.

In another preferred embodiment, the calculated or estimated COP may be at least partly based on COP values attained by, or simulated for the system under similar relative or absolute humidities, e.g., within ±15%, within ±10%, within ±8%, or within ±5%.

In yet another preferred embodiment, the calculated or estimated COP may be at least partly based on COP values attained by, or simulated for the system under similar make-up water flow quantities or flowrates, e.g., within ±30%, within ±20%, within ±15%, or within ±12%.

In yet another preferred embodiment, the calculated or estimated COP may be at least partly based on COP values attained by, or simulated for, the system under similar make-up water temperatures, e.g., within ±3° C., within ±2° C., or within ±1.5° C.

In yet another preferred embodiment, the calculated or estimated COP may be at least partly based on COP values attained by, or simulated for the system under similar energy demand or forecasted energy demand, e.g., within ±30%, within ±20%, within ±15%, or within ±12%.

Alternatively or additionally, processor 150 may perform a regression, or utilize a regression, e.g., based on measured values of the system, measured values of a similar system, and the like. The regression (or another modeling method) may find a particular relation (e.g., a linear relation) between the COP and a one or more of the following parameters: ambient temperature, ambient humidity, inlet water flow rate, inlet water temperature, energy demand, etc. Once established, this relationship may be expressed as a formula or another mathematical model (e.g., a look-up table), allowing a forecast of the expected COP, given specific values of the above-mentioned parameter or parameters. This formula may be occasionally re-calculated or updated as further data on system performance is obtained.

The measurement-based calculation of the COP may be effected by measuring the temperature of the water flowing towards, or introduced to condenser 122, e.g., via cold or inlet water pipe 206, the temperature of the heated water exiting or heading away from condenser 122, e.g., via hot or outlet pipe 208, and the flowrate of the water (identical for both streams). Similarly, if there is a secondary (or tertiary, etc.) circulation arrangement in the system, as shown by way of example in FIGS. 2A and 2B, the temperature indicators may be disposed thereon (e.g., before and after the secondary heat exchanger), and the measurement of heat transfer may be based on a difference between the measured temperatures, and on a measured, estimated, or calculated flowrate and heat capacity of the liquid flowing within the circulation arrangement.

Demand forecast input 155 may include demand forecast data based on known or estimated occupancy data. Such data may be automatically available to processor 150, e.g., via a communication line associated with a computer containing registration data for the consumer network, building or organization (e.g., a hotel or hospital) having hot water consumers 144 and/or conditioning consumers 146. Alternatively or additionally, such data may be manually input to processor 150. For example, the hotel staff may be alerted that 2 busses containing tourists are to unexpectedly arrive at the hotel within an hour. The hotel staff may then input demand forecast input 155 pertaining to approximately 100 new arrivals to the hotel.

Processor 150 may include a memory storing a first set of one or more criteria specifying when water is to be heated by conventional heating system 110 and a second set of one or more criteria specifying when water is to be heated by heat pump water heating system 120. As will be elaborated in greater detail hereinbelow, processor 150 processes information from at least a portion of inputs 151-155 and may control operation of conventional heating system 110 and heat pump water heating system 120 based on these sets of criteria.

Processor 150 may advantageously include, or be associated with, a clock. Processor 150 may also include a user input device, such as a keypad, which allows a user to manually input any of inputs 151-155.

We will now proceed to describe, in exemplary fashion, operation of hybrid heating and conditioning system 200 in accordance with another aspect of the present invention.
Conditioning for Consumers In cooling mode, chiller system 130 operates as a heat pump to transfer heat from the fluid (typically water) in a return line 244 to the environment. The chilled fluid is recirculated to storage tank 135, and from there to at least one conditioning consumer 146. For example, the chilled fluid may be used to cool particular conditioning consumers 146a, 146b, and 146c by means of a heat exchanger associated with these conditioning consumers. One skilled in the art will readily appreciate that the chilled fluid may be used to indirectly cool particular conditioning consumers 146a, 146b, and 146c, e.g., by cooling a stream of air that is then circulated to consumers 146a, 146b, and 146c.
Hot Water Supply for Consumers Hybrid heating system 200 is adapted to supply hot water for consumption by at least one consumer 144 in at least two modes: conventional heating mode using conventional heating system 110, and heat pump heating mode using heat pump water heating system 120.

In the conventional heating mode, water to be heated may be delivered from storage tank 125 to (surface) heat exchanger 113 via inlet water pipe 204. A hot fluid such as water is circulated from boiler 112 to heat exchanger 113, where heat is delivered from the hot fluid to the water, which may be returned to storage tank 125 or introduced to another storage facility. Flowmeter F3 may be utilized to measure a flow quantity (e.g., volume) or flowrate of fuel to boiler 112, in order to calculate fuel consumption.

In the heat pump heating mode, water to be heated may be circulated from storage tank 125 to (surface) condenser 122 via cold or inlet water pipe 206. Heat provided to the water is mainly from the latent heat associated with the condensation of the refrigerant gas. The heated water may be returned to storage tank 125 (e.g., via hot or outlet pipe 208) or introduced to another storage facility. The heated water may also be passed through heat exchanger 113, as will be elaborated hereinbelow. Power-measuring instrument P1 may be utilized to measure the power consumption of heat pump water heating system 120, or the power consumption of compressor 121, which is the main power consumer of system 120.

In both the conventional heating mode and the heat pump heating mode, the heated water is delivered from, and returned to, one or more storage tanks such as storage tank 125, via circulation line 126. Hot water delivery line 129, which is a section of circulation line 126, is utilized to deliver the heated water to at least one consumer 144, such as particular hot water consumers 144a, 144b, and 144c. Unconsumed hot water is returned to storage tank 125, via another section of circulation line 126, recirculation line 128.

Temperature indicator T2 may be disposed on hot water delivery line 129. Temperature indicator T3 may be disposed on recirculation line 128. Flowmeter F2 may be disposed anywhere on circulation line 126.

Make-up water may be introduced, via pipe 202, to storage tank 125, or via make-up lines 202a and 202b, to cold water pipes 204 or 206 associated with storage tank 125. At least one flowmeter F1 may be disposed on lines 202, 202a and/or 202b to provide a total flow or flowrate of the make-up water.

One of ordinary skill in the art will readily envision the use of valves (such as solenoid valves or electrically-controlled valves) and the like, as well as any other auxiliary equipment, to control hybrid heating system 200 in general, and heat pump system 130, heat pump water heating system 120, and conventional heating system 110, in particular.

Figure 2A:
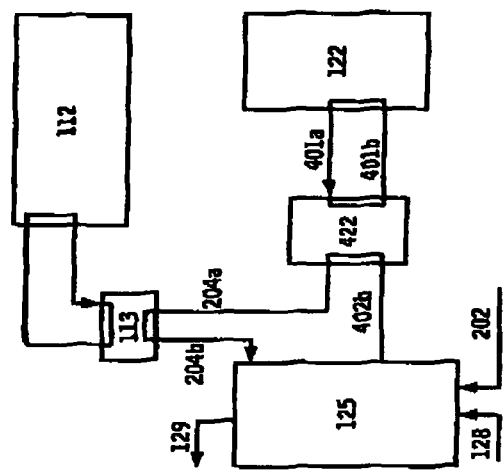
FIG. 2A provides a portion of a schematic flowsheet of a hybrid heating and conditioning system according to another preferred embodiment of the present invention.

FIG. 2A provides a portion of a schematic flowsheet of a hybrid heating and conditioning system according to another preferred embodiment of the present invention. The flowsheet may be largely identical to the flowsheet provided in FIG. 2, with the exception of the interface between storage tank 125 and condenser 122. The system includes an additional or secondary surface heat exchanger 422 that may be disposed, from a process standpoint, between condenser 122 and the consumer, or as shown, storage tank 125. Between condenser 122 and heat exchanger 422 is a primary loop, cycle, or circulation arrangement 430, in which a heat exchange fluid, typically a liquid, is introduced to condenser 122 via a line or condenser inlet 401b. After absorbing heat within condenser 122 (the primary heat exchanger), the heated heat exchange fluid may exit condenser 122 via line or condenser outlet 401a.

The heated heat exchange fluid may then transfer heat to another, secondary fluid (typically a liquid such as water), in heat exchanger 422. Between storage tank 125 and heat exchanger 422 is a secondary loop, cycle, or circulation arrangement 440, which may be adapted to introduce the secondary fluid to heat exchanger 422 via a line or pipe 402b. After absorbing heat within heat exchanger 422 (the secondary heat exchanger), the heated secondary fluid may exit heat exchanger 422 via line or pipe 402a. Temperature indicators and/or flow indicators may be installed on lines 401a, 401b, 402a, and/or 402b, as well as on lines 204a and 204b, and the information may be provided to the processor for calculation and control purposes.

Figure 2B:
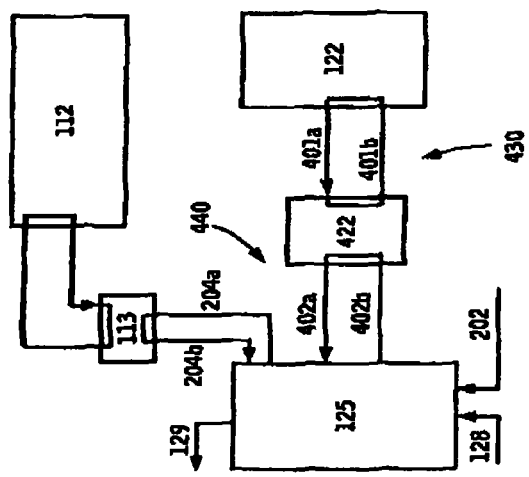
FIG. 2B provides a portion of a schematic flowsheet of a hybrid heating and conditioning system according to yet another preferred embodiment of the present invention.

FIG. 2B provides a portion of a schematic flowsheet of a hybrid heating and conditioning system according to another preferred embodiment of the present invention. While largely similar to the flowsheet provided in FIG. 2A, the secondary fluid within the secondary loop may pass through heat exchanger 113 (via lines 204a and 204b) prior to being returned to storage tank 125. Alternatively or additionally, the secondary fluid within the secondary loop may not be returned to storage tank 125, rather the secondary fluid may be provided directly to a consumer via a line connected to line 402a (in FIG. 2A) or via a line connected line to 204a or 204b (in FIG. 2B).

Figure 3:
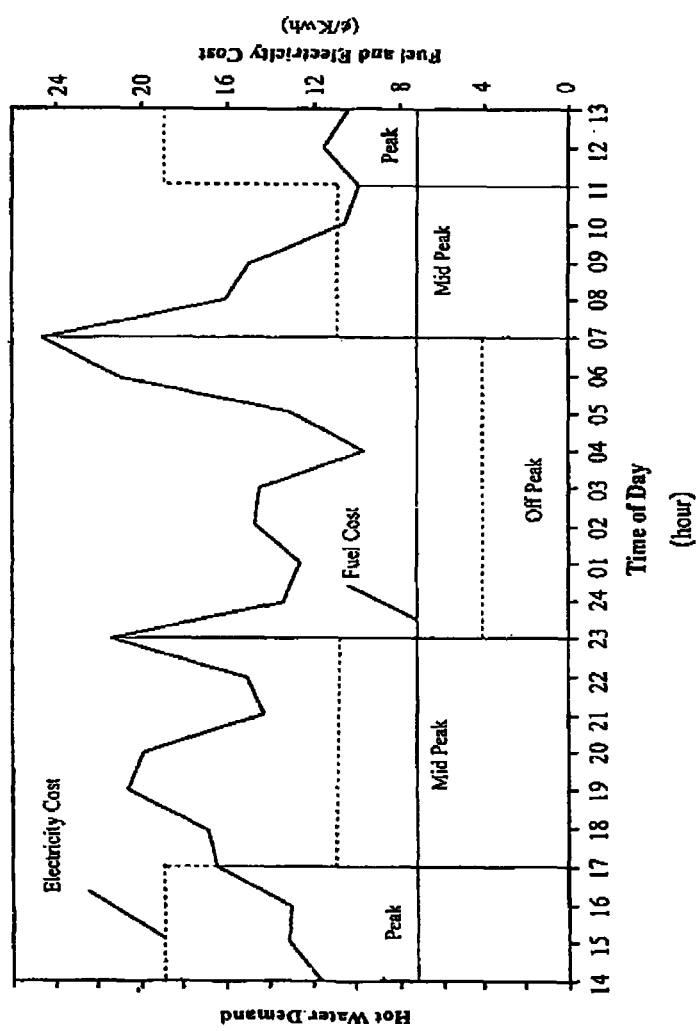
FIG. 3 is an exemplary graph of hourly hot water demand and specific fuel and electricity costs as a function of time of day, for a hybrid heating system operating in a consumer network, according to the present invention.

FIG. 3 is an exemplary graph of hourly hot water demand and specific fuel and electricity costs as a function of time of day, for an inventive system such as hybrid heating system 200, operating in a consumer network such as a hotel. The hourly hot water demand or load, plotted on the $1^{st}$ Y-axis, attains a maximum at around 7 AM, presumably when a large portion of particular consumers are showering. The hourly electricity consumption is near-minimum between midnight and 5 AM, presumably when many of the consumers are sleeping, and again between 10 AM and 2 PM, presumably when many of the consumers are not on the premises.

The specific electricity cost is plotted on the $2^{nd}$ Y-axis, as a function of time of day. Three rates are observed: a peak rate of 17.8 ¢/kWh; a mid-peak rate of 11.4¢/kWh, and an off-peak rate of 4.2¢/kWh. In this example, the off-peak rate is less than 25% of the peak rate.

The specific fuel cost is also plotted on the $2^{nd}$ Y-axis, as a function of time of day. Per unit power, the fossil fuel used to fire heating system 110 is observed to be less expensive during most hours of the day. However, processor 150 may calculate or estimate (or be provided with) both:

the coefficient of performance (COP) of heat pump water heating system 120, and the thermal efficiency of heating system 110.

Thus, processor 150 may calculate and compare the cost of operating heat pump water heating system 120 and heating system 110, and control operation of the two systems to reduce or minimize cost.

Features of Processor 150

In addition to the features of processor 150 described hereinabove, processor 150 may also have the following features:

1. processor 150 may be adapted to receive and to process cost data pertaining to conventional heating system 110 and heat pump water heating system 120, along with data pertaining to at least one ambient parameter or condition and/or various system parameters, and to control operation of heating system 110 and heat pump water heating system 120 based, at least partially, on these inputs.

2. processor 150 may be adapted to control operation of heat pump water heating system 120 concurrently with operation of heat pump system 130, wherein system 120 and system 130 operate in opposite heating modes. Thus, heat pump water heating system 120 can heat water while system 130 is in cooling mode.

Moreover, even when system 130 is in cooling mode, processor 150 utilizes the cost data in deciding (by means of a decision algorithm, sets of criteria, etc.) whether to operate heating system 110 or heat pump water heating system 120.

3. processor 150 may be adapted to control operation of heat pump water heating system 120 to increase a thermal storage of the thermal storage arrangement during periods of off-peak electricity rates (i.e., based on a "time-of-use" pricing scheme). To this end, it may be advantageous to have a thermal storage arrangement, associated with heat pump water heating system 120, having a holdup volume of at least 500 liters (preferably, at least 1,000 or at least 2,000 liters, and in some cases, at least 6,000 liters, at least 10,000 liters, or at least 15,000 liters) per 100 kW capacity of system 120.

4. The increase in thermal storage may be effected by increasing the fill volume of the thermal storage. Alternatively or additionally, the increase in thermal storage may be effected by increasing the temperature of the water produced by heat pump water heating system 120.

5. processor 150 may be adapted to control operation of heat pump water heating system 120 to increase a thermal storage of the thermal storage arrangement responsive to a forecast pertaining to a hot water load or demand.

The forecast may be based on known or estimated occupancy data. Such data may be automatically available to processor 150, e.g., via a communication line associated with a computer containing registration data for the central body, building or organization (e.g., a hotel or hospital) having hot water consumers 144 and/or conditioning consumers 146. Alternatively or additionally, such data may be manually input to processor 150. For example, the hotel staff may be alerted that 2 busses containing tourists are to unexpectedly arrive at the hotel within an hour. The hotel staff may then input demand forecast input 155 pertaining to approximately 100 new arrivals to the hotel.

Processor 150 may be further adapted to receive at least one demand forecast input 155 including data pertaining to, or correlated with, future demand for hot water or other utilities.

Demand forecast input 155 may be at least partially based on a current value or estimation of hot water demand or consumption, e.g., by receiving an input from flowmeter F1 pertaining to a current flowrate of the make-up water (e.g., within the last ½ hour, within the last hour, within the last 2 hours), that may provide some indication of the expected demand. Demand forecast input 155 may include demand forecast data based on typical or historical demand trends as a function of time of day. Such demand forecast data may include seasonal demand trends, demand from the same day of the week (from the previous week, previous month, etc.), demand from at least one period having similar weather conditions, etc.

6. processor 150 may be adapted to control operation of heating system 110 and heat pump water heating system 120 based on a first predicted efficiency or performance of heat pump water heating system 120 that is dependent on the at least one ambient parameter (or another parameter extensive to the system, such as flowrate and/or temperature of the make-up water), and a second predicted efficiency or performance pertaining to the conventional heating system 110. Typically, the at least one ambient parameter includes an ambient temperature and an ambient humidity.

The predicted efficiency or performance of conventional heating system 110 may be dependent on a forecast of a hot water load or demand.

The predicted efficiency may be dependent on a variable efficiency parameter of conventional heating system 110. For example, the variable efficiency parameter may provide an estimated efficiency of heating system 110 based on a time position within a maintenance cycle of heating system 110.

EXAMPLES

Reference is now made to the following examples, which together with the above descriptions, illustrate the invention in a non-limiting fashion.

Example 1

The annual fuel cost of a hotel operating a conventional heating system ("System I") is calculated by a simulator to be 106,800 Euros. A heat pump water heating system is then integrated with the conventional heating system, along with a processor adapted to receive and to process cost data and efficiency and COP data pertaining to the conventional heating system and the heat pump water heating system, and to control operation of the heating system and the heat pump water heating system based on these inputs.

A COP of 2.8, corresponding to the nominal (manufacturer's) COP rating, is provided to the processor.

Utilizing this integrated system ("System II"), the simulator calculates an annual fuel cost of 94,925 Euros, a cost reduction of about 11.1%.

The simulation is then performed using a COP of 2.35, corresponding to an average measured COP value of the system, under actual operating conditions ("System III").

Utilizing this average measured COP value, the simulator calculates an annual fuel cost of 84,694 Euros, a cost reduction of about 20.7% with respect to the original heating system, and an additional cost reduction of about 10.8% with respect to System II.

Moreover, with respect to System III, System II makes a wrong decision regarding which heating system to operate (or which system is economically preferable) in approximately 37% of the decisions.

Example 2

The annual fuel cost of a hotel operating a conventional heating system ("System I") is calculated by a simulator to be 120,150 Euros. A heat pump water heating system and processor are then integrated with the conventional heating system, as in System III of Example 1.

The simulation is then performed using a COP of 2.35, corresponding to an average measured COP value of the system, under actual operating conditions. Utilizing this average measured COP value, the simulator calculates an annual fuel cost of 93,112 Euros, a cost reduction of about 22.5% with respect to the original heating system.

The processor is then further adapted to control the operation of the conventional heating system and the heat pump water heating system based on a predicted (correlated) performance of the heat pump water heating system that is dependent on the ambient temperature ("System IV"). Regression is performed on actual system data (under actual operating conditions) to obtain the correlation, i.e., the heat pump water heating system performance (COP) as a function of the ambient temperature.

Utilizing this correlated COP value, the simulator calculates an annual fuel cost of 86,101 Euros, a cost reduction of about 28.3% with respect to the original heating system, and an additional cost reduction of about 9.2% with respect to System III.

Moreover, with respect to System IV, System III makes a wrong decision regarding which heating system to operate (or which system is economically preferable) in about 26% of the decisions.

As used herein in the specification and in the claims section that follows, the term "conventional heating system" is specifically meant to include fossil-fuel consuming systems such as various liquid-fuel (e.g., oil, diesel fuel, gasoline, natural gas) burning systems, and solid-fuel (e.g., coal) burning systems; biomass consuming systems, including cellulose, lignin, and any products and/or by-products thereof; and electrical heating systems such as resistance (e.g., coil) heaters. The term "conventional heating system" is specifically meant to exclude heat pump systems such as a heat pump water heating system, whether powered by electricity, liquid fuel, or other means.

As used herein in the specification and in the claims section that follows, the term "opposite heating modes", with respect to two heat pump systems, refers to a state in which one of the heat pump systems operates in a heating mode, so as to heat water or other heat-exchange fluid while cooling the environment, while the other heat pump system operates in a cooling mode, so as to cool water or other heat-exchange fluid while pumping heat to the environment.

As used herein in the specification and in the claims section that follows, the term "fossil fuel" refers to fuels derived from living matter, typically from a previous geological time or period, such fuels including diesel fuel, coal, liquid petroleum gas (LPG), natural gas, and heavy (or crude) oil.

As used herein in the specification and in the claims section that follows, the term "to direct a heated flow of liquid towards the consumer" and the like, refers to a flow of heated liquid, typically water, that is directly delivered to the consumer (e.g., sink, shower stall, radiator, swimming pool), indirectly delivered to the consumer (e.g., via a storage tank) or is delivered to another heat exchanger (e.g., in a secondary loop or cycle), to produce another heated flow of liquid that is directed towards the consumer. As a first example, in a heat pump system having solely a primary loop or arrangement, the heated flow of liquid may be pumped directly to the consumer such as consumer 144a or 146a of FIG. 2, or the heated flow of liquid may be pumped to the heat exchanger (e.g., exchanger 113) to absorb additional heat before being pumped to the storage tank or directly to the consumers. As a second example, in a heat pump system having a primary circulation arrangement and a secondary circulation arrangement (e.g., primary loop 430 and secondary loop 440 of FIG. 2A), the heated flow of liquid may be pumped to the secondary heat exchanger (e.g., exchanger 422) whereby the water ultimately delivered to the consumers (e.g., via line 129) is first heated in the secondary heat exchanger.

Throughout this disclosure, various aspects of this invention can be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 10 should be considered to have specifically disclosed subranges such as from 1 to 2, from 1 to 5, from 1 to 8, from 3 to 4, from 3 to 8, from 3 to 10, etc., as well as individual numbers within that range, for example, 1, 2, 3, 4, 5, 6, 7, 8, 9, and 10. This applies regardless of the breadth of the range.

Similarly, the terms "at least", "exceeds", and the like, followed by a number (including a percent or fraction), should be considered to have specifically disclosed all the possible subranges above that number, as well as individual numerical values above that number. For example, the term "at least 75" should be considered to have specifically disclosed subranges such as 80 and above, 90 and above, etc, as well as individual numbers such as 85 and 95.

Similarly, the terms "less than", "below", and the like, followed by a number (including a percent, fraction, or ratio such as a weight ratio), should be considered to have specifically disclosed all the possible subranges below that number, as well as individual numerical values below that number. For example, the term "below 75%" should be considered to have specifically disclosed subranges such as 70% and below, 60% and below, etc, as well as individual numbers such as 65% and 50%.

Whenever a numerical range is indicated herein, the range is meant to include any cited numeral (fractional or integral) within the indicated range. The phrase "ranging/ranges between" a first number and a second number and "within a range of" a first number to a second number, and the like, are used herein interchangeably and are meant to include the first and second indicated numbers and all the fractional and integral numerals therebetween.

It will be appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable sub-combination.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

What is claimed is:

1. A hybrid heating system comprising:
   (a) a heat pump water heating system including:
      (i) a pressurizing arrangement, associated with a refrigerant circulation pipe, adapted to increase a pressure of a first refrigerant fluid to produce a pressurized refrigerant fluid;
      (ii) a first heat exchange system including:
      a primary circulation arrangement, including, and fluidly communicating with, a first heat exchanger,
      said first exchanger fluidly communicating with said refrigerant circulation pipe, said first exchanger and said primary circulation arrangement adapted to effect an indirect heat exchange between a first flow of liquid and said pressurized refrigerant fluid, whereby heat is transferred from said pressurized refrigerant fluid to said first flow of liquid to produce a first heated flow of liquid, and whereby an enthalpy-reduced refrigerant fluid is produced,
      said heat exchange system optionally including at least a secondary circulation arrangement having, and fluidly communicating with, a secondary heat exchanger,
      (iii) a depressurizing arrangement, fluidly communicating with said refrigerant circulation pipe, and adapted to receive said enthalpy-reduced refrigerant fluid and to reduce a pressure thereof, to produce a depressurized refrigerant fluid having a lower pressure than said enthalpy-reduced fluid, and
      (iv) a second heat exchanger, said second exchanger fluidly communicating with said circulation pipe, and adapted to effect an exchange of heat between said depressurized refrigerant fluid and a heat source, whereby said first refrigerant fluid is produced;
   (b) a conventional heating system including at least one conventional heater having a surface heat exchanger, and a second primary circulation arrangement fluidly communicating with said surface exchanger, said second primary circulation arrangement adapted to effect an exchange of heat between said surface heat exchanger and a second flow of liquid to produce a second heated flow of liquid;
   (c) a plurality of sensors, each adapted to measure at least one system parameter, said plurality of sensors including at least a first temperature sensor and a second temperature sensor associated with said heat exchange system;
   (d) an input arrangement adapted to provide cost data pertaining to a first power cost for supplying power to said heat pump water heating system, and to cost information pertaining to a second power cost for operating said conventional heating system;
   (e) a processor including a memory storing criteria specifying when to operate said heat pump water heating system, and when to operate said conventional heating system,
   said processor adapted to receive and to process:
      (i) said cost data;
      (ii) said cost information;
      (iii) data pertaining to said at least one system parameter;
      (iv) flow information pertaining to a flowrate of a liquid within any said circulation arrangement of said first heat exchange system, and
      (v) power consumption information pertaining to a power consumption of at least a portion of said heat pump water heating system;
   (f) an air conditioning system adapted to cool at least one volume, space or room,
   said heat pump water heating system and said air conditioning system adapted to operate, upon demand, concurrently in opposite heating modes,
   wherein, when said air conditioning system operates in cooling mode, said processor is adapted to receive and to process said cost data, said cost information, data pertaining to said at least one system parameter, flow information pertaining to a flowrate of said first flow of liquid, and power consumption information pertaining to a power consumption of at least a portion of said heat pump water heating system, and to control operation of said conventional heating system and said heat pump water heating system based on said criteria.

2. The hybrid heating system of claim 1, said processor adapted to calculate and compare a cost of operating said heat pump water heating system and a cost of operating said conventional heating system, based on said cost data, said cost information, said data pertaining to said at least one system parameter, said flow information, and said power consumption information.

3. The hybrid heating system of claim 1, wherein said processor is adapted to utilize said cost data and to decide whether to operate said conventional heating system or to operate said heat pump water heating system.

4. The hybrid heating system of claim 1, further including a power consumption sensor adapted to provide said power consumption information, and further including a flow sensor, associated with any said circulation arrangement, and adapted to provide said flow information.

5. The hybrid heating system of claim 1, wherein, based on said criteria, said processor is adapted to operate said conventional heating system and said heat pump water heating system in a simultaneous mode.

6. The hybrid heating system of claim 1, said processor further adapted to control operation of said conventional heating system and said heat pump water heating system based on a first predicted performance of said heat pump water heating system, said predicted performance dependent on at least one parameter selected from the group of parameters consisting of an ambient parameter, an inlet liquid temperature to said first exchanger, and an inlet liquid flowrate to said first exchanger.

7. The hybrid heating system of claim 6, said processor further adapted to control operation of said conventional heating system and said heat pump water heating system based on a second predicted performance of said conventional heating system.

8. The hybrid heating system of claim 7, said second predicted performance being dependent on a forecast of a hot water load or demand.

9. The hybrid heating system of claim 7, said second predicted performance being dependent on a variable efficiency parameter of said conventional heating system.

10. The hybrid heating system of claim 9, said variable efficiency parameter providing an estimated efficiency of said conventional heating system based on a time position within a maintenance cycle of said conventional heating system, and wherein said conventional heater includes at least one steam boiler.

11. The hybrid heating system of claim 6, said at least one ambient parameter including an ambient humidity.

12. The hybrid heating system of claim 1, said criteria being at least partly based on coefficient of performance (COP) information pertaining to said heat pump water heating system.

13. The hybrid heating system of claim 12, said COP information being derived from said data pertaining to said data pertaining to said at least one system parameter, said flow information, and said power consumption information.

14. The hybrid heating system of claim 12, said COP information including an average COP of said heat pump water heating system, said average based on a plurality of said one particular period of time.

15. The hybrid heating system of claim 12, said COP information being based on a plurality of actual COP data previously attained by said heat pump system.

16. The hybrid heating system of claim 15, said plurality of actual COP data being weighted according to a similarity criterion between past operating conditions and present operating conditions of said heat pump water heating system.

17. The hybrid heating system of claim 12, said COP information being based on a regression of a plurality of actual COP data previously attained by said heat pump system, wherein a weighting of said actual COP data is based on a similarity criterion between past operating conditions and present operating conditions of said heat pump water heating system.

18. A hybrid heating system comprising:
  (a) a heat pump water heating system including:
    (i) a pressurizing arrangement, associated with a refrigerant circulation pipe, adapted to increase a pressure of a first refrigerant fluid to produce a pressurized refrigerant fluid;
    (ii) a first heat exchange system including:
    a primary circulation arrangement, including, and fluidly communicating with, a first heat exchanger,
    said first exchanger fluidly communicating with said refrigerant circulation pipe, said first exchanger and said primary circulation arrangement adapted to effect an indirect heat exchange between a first flow of liquid and said pressurized refrigerant fluid, whereby heat is transferred from said pressurized refrigerant fluid to said first flow of liquid to produce a first heated flow of liquid, and whereby an enthalpy-reduced refrigerant fluid is produced,
    said heat exchange system optionally including at least a secondary circulation arrangement having, and fluidly communicating with, a secondary heat exchanger,
    (iii) a depressurizing arrangement, fluidly communicating with said refrigerant circulation pipe, and adapted to receive said enthalpy-reduced refrigerant fluid and to reduce a pressure thereof, to produce a depressurized refrigerant fluid having a lower pressure than said enthalpy-reduced fluid, and
    (iv) a second heat exchanger, said second exchanger fluidly communicating with said circulation pipe, and adapted to effect an exchange of heat between said depressurized refrigerant fluid and a heat source, whereby said first refrigerant fluid is produced;
  (b) a conventional heating system including at least one conventional heater having a surface heat exchanger, and a second primary circulation arrangement fluidly communicating with said surface heat exchanger, said second primary circulation arrangement adapted to effect an exchange of heat between said surface heat exchanger and a second flow of liquid to produce a second heated flow of liquid;
  (c) a plurality of sensors, each adapted to measure at least one system parameter, said plurality of sensors including at least a first temperature sensor and a second temperature sensor associated with said heat exchange system;
  (d) an input arrangement adapted to provide cost data pertaining to a first power cost for supplying power to said heat pump water heating system, and to cost information pertaining to a second power cost for operating said conventional heating system;
  (e) a processor including a memory storing criteria specifying when to operate said heat pump water heating system, and when to operate said conventional heating system,
  said processor adapted to receive and to process:
    (i) said cost data;
    (ii) said cost information;
    (iii) data pertaining to said at least one system parameter;
    (iv) flow information pertaining to a flowrate of a liquid within any said circulation arrangement of said first heat exchange system, and
    (v) power, consumption information pertaining to a power consumption of at least a portion of said heat pump water heating system;
  (f) an air conditioning system adapted to cool at least one volume, space or room,
  said heat pump water heating system and said air conditioning system adapted to operate, upon demand, concurrently in a heating mode,
  wherein, when said air conditioning system operates in said heating mode, said processor is adapted to receive and to process said cost data, said cost information, data pertaining to said system parameters, flow information pertaining to a flowrate of said first flow of liquid, and power consumption information pertaining to a power consumption of at least a portion of said heat pump water heating system, and to control operation of said conventional heating system and said heat pump water heating system based on said criteria.

19. The hybrid heating system of claim 18, said processor adapted to calculate and compare a cost of operating said heat pump water heating system and a cost of operating said conventional heating system, based on said cost data, said cost information, said data pertaining to said at least one system parameter, said flow information, and said power consumption information.

20. The hybrid heating system of claim 19, said processor being adapted to utilize said cost data and to decide whether to operate said conventional heating system or to operate said heat pump water heating system.

21. The hybrid heating system of claim 18, said criteria being at least partly based on coefficient of performance (COP) information pertaining to said heat pump water heating system.

22. The hybrid heating system of claim 21, said COP information being based on a regression of a plurality of actual COP data previously attained by said heat pump system, wherein a weighting of said actual COP data is based on a similarity criterion between past operating conditions and present operating conditions of said heat pump water heating system.

* * * * *